United States Patent
Li et al.

(10) Patent No.: US 11,880,575 B2
(45) Date of Patent: Jan. 23, 2024

(54) ADAPTIVE MEMORY DEVICE POWER SAVING SETTING IN AN INFORMATION HANDLING SYSTEM

(71) Applicant: Dell Products L.P., Round Rock, TX (US)

(72) Inventors: Wenhua Li, Singapore (SG); Ghim Teck Toh, Singapore (SG); Vinoth John Paul Nedunchezhian, Singapore (SG)

(73) Assignee: Dell Products L.P., Round Rock, TX (US)

( * ) Notice: Subject to any disclaimer, the term of this patent is extended or adjusted under 35 U.S.C. 154(b) by 39 days.

(21) Appl. No.: 17/676,456

(22) Filed: Feb. 21, 2022

(65) Prior Publication Data

US 2023/0266889 A1    Aug. 24, 2023

(51) Int. Cl.
 *G06F 3/06*    (2006.01)

(52) U.S. Cl.
CPC .......... *G06F 3/0625* (2013.01); *G06F 3/0611* (2013.01); *G06F 3/0629* (2013.01); *G06F 3/0653* (2013.01); *G06F 3/0679* (2013.01)

(58) Field of Classification Search
CPC ......... Y02D 10/00; G06F 1/32; G06F 1/3203; G06F 1/3206; G06F 1/3225; G06F 1/3215; G06F 1/3268; G06F 1/3275; G06F 3/0625; G06F 3/0634; G06F 3/0679
See application file for complete search history.

(56) References Cited

U.S. PATENT DOCUMENTS

| | | | | |
|---|---|---|---|---|
| 5,682,273 A | * | 10/1997 | Hetzler | G06F 3/0601 360/71 |
| 2009/0187779 A1 | * | 7/2009 | Liu | G06F 1/3221 713/323 |
| 2009/0327780 A1 | | 12/2009 | Dawkins et al. | |
| 2011/0283286 A1 | | 11/2011 | Wu et al. | |
| 2014/0173314 A1 | * | 6/2014 | Min | G06F 1/3206 713/323 |
| 2017/0052583 A1 | * | 2/2017 | Adavi | G06F 1/3275 |
| 2017/0371399 A1 | * | 12/2017 | Weissmann | G06F 1/266 |
| 2018/0239609 A1 | | 8/2018 | Jang et al. | |
| 2018/0373428 A1 | | 12/2018 | Kan et al. | |
| 2019/0303024 A1 | * | 10/2019 | Iwai | G06F 3/061 |

* cited by examiner

*Primary Examiner* — Curtis James Kortman
(74) *Attorney, Agent, or Firm* — Larson Newman, LLP (57) ABSTRACT

An information handling system includes a host controller, a memory device, and a processor. The memory device receives I/O commands from the host controller. The memory device includes a processor. The processor sets an initial idle time prior to transition (ITPT) setting as a current ITPT setting for a memory device of an information handling system, and monitors input/output (I/O) commands from a host in the information handling system. While monitoring the I/O commands, the processor increases a first counter in response to the memory device entering a non-operational mode based on the current ITPT setting, and increases a second counter in response to the memory device entering an operational mode within a particular amount of time from when the memory device entered the non-operational mode. The processor further varies the current ITPT setting based on a current ratio of the second counter to the first counter.

17 Claims, 8 Drawing Sheets

ADAPTIVE MEMORY DEVICE POWER SAVING SETTING IN AN INFORMATION HANDLING SYSTEM

FIELD OF THE DISCLOSURE

The present disclosure generally relates to information handling systems, and more particularly relates to an adaptive memory device power saving setting in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a host controller, a memory device, and a processor. The memory device may receive I/O commands from the host controller. The memory device includes a processor. To save power, the processor or a host controller may set an initial idle time prior to transition (ITPT) setting as a current ITPT setting for a memory device of an information handling system, and monitor input/output (I/O) commands from a host in the information handling system. While monitoring the I/O commands, the processor may increase a first counter in response to the memory device entering a non-operational mode based on the current ITPT setting, and increase a second counter in response to the memory device entering an operational mode within a particular amount of time from when the memory device entered the non-operational mode. The processor further may optimize the current ITPT setting based on a current ratio of the second counter to the first counter to maximize the power savings while impacting less in memory device's responsiveness.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
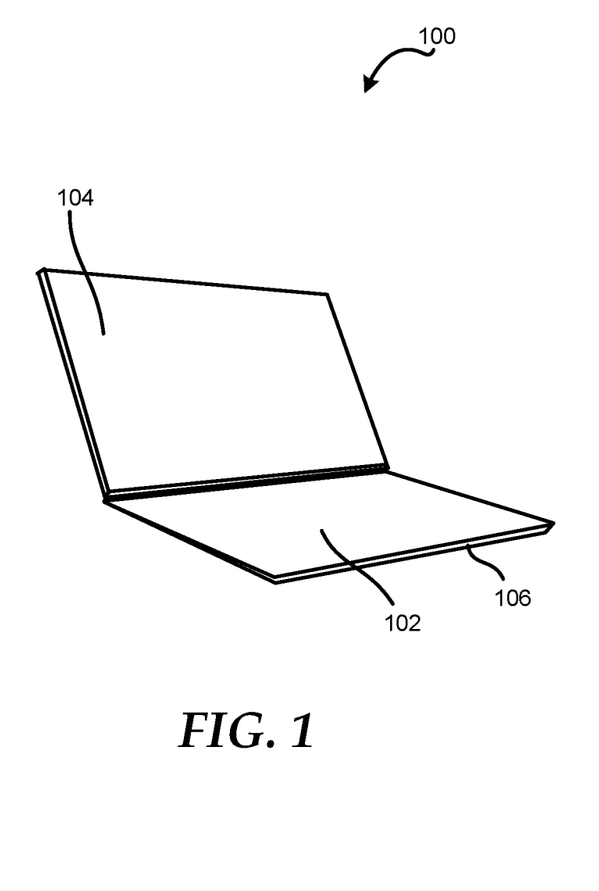
FIG. 1 is a perspective view of an information handling system according to at least one embodiment of the disclosure.

FIG. 1 illustrates an information handling system 100 according to at least one embodiment of the disclosure. For purpose of this disclosure information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price.

Information handling system 100 includes a base 102 and a display device 104. Base 102 includes a cover 106, which in turn may surround one or more components of information handling system 100. In an example, the components of information handling system 100 may be any suitable components, such as the components described for information handling system 200 in FIG. 2, information handling system 800 in FIG. 8, or the like.

Figure 2:
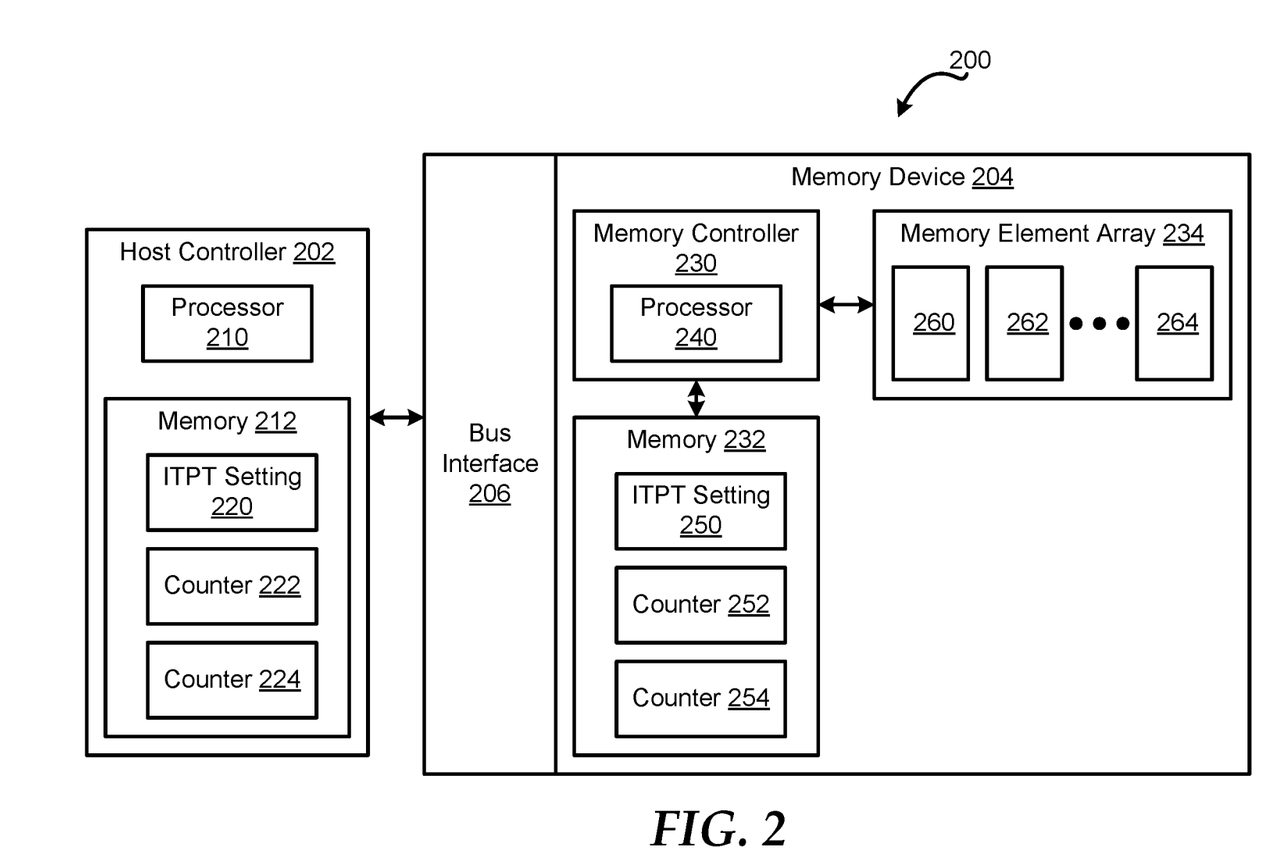
FIG. 2 is a block diagram of a portion of an information handling system according to at least one embodiment of the present disclosure.

During operation, information handling system 100 may store data in a memory device, such as memory device 204 of FIG. 2. In an example, the memory device may be any suitable type of memory device including, but not limited to, a non-volatile memory express solid state device (NVMe SSD). In certain examples, the memory device may include a power saving mechanism to allow the memory device enter into a non-operational power mode when the memory drive in an active idle mode for certain period of time. The memory device may be placed in the active idle mode in any suitable manner including, but not limited to, a host command, a memory device self-initiated transition, and the like. While the memory drive is in a non-operational power state, the power consumed by the memory device may be substantially equal to zero Watts. In an example, the power saving feature of the memory device may be incredibly important for information handle system 100 especially if the information handling system is a portable device by improving the battery life of the information handling system.

FIG. 2 illustrates a portion of an information handling system 200 according to at least one embodiment of the present disclosure. In an example, information handling system 200 may be substantially similar to information handling system 100 of FIG. 1. Information handling system 200 includes a host controller 202, a memory device 204, and a bus interface 206. Host controller 202 includes a processor 210 and a memory 212, which in turn may store any suitable data including, but not limited to, an idle time prior to transition (ITPT) setting 220, a counter 222, and a counter 224. Memory device 204 includes a memory controller 230, a memory 232, and a memory element array 234. While memory 232 is illustrated as being external of memory controller 230, memory 232 may be internal to memory controller 230 without varying from the scope of this disclosure. Memory controller 230 includes a processor 240. Memory 232 may store any suitable data including, but not limited to, an ITPT setting 250, a counter 252, and a counter 254. Memory element array 234 may be any suitable array, such as a non-volatile memory array. Memory element array 234 may be comprised of one or more separate memory elements 260, 262, and 264 that may be flash memory or any other solid-state memory. In certain examples, the individual memory elements 260, 262, and 264 may be NAND flash memory elements that are organized into arrays.

In an example, memory controller 230 may utilize any suitable communication channel, by which the memory controller may receive certain commands from host controller 202, such as an end of session command informing the memory controller that the host controller is powering down or restarting. For example, memory device 204 may be connected to host controller 202 according to various embodiments. This connection between memory device 204 and host controller 202 may utilize bus interface 206. Bus interface 206 may be any physical connection capable of supporting a peripheral component interconnect express (PCIe) bus interface connection between host controller 202 and memory device 204. In certain examples, processors 210 and 240 may be any suitable processing devices, such as microprocessors, microcontrollers, application-specific integrated circuits (ASICs), field-programmable gate arrays (FPGAs), or the like. In any example, memories 212 and 232 may be referred to as DRAM memories or volatile memories.

Processor 240 of memory controller 230 may be used to execute software code, in particular firmware and/or machine software code that implements the read and write operations supported by the memory controller. These supported read and write operations may be used to access memory element array 234 that provides the main storage of memory device 204 that is typically available to the operating system of host controller 202.

As stated above, memory device 204 may be placed in a non-operational mode to save power within information handling system 200. In an example, an ITPT setting, such as ITPT setting 220 in memory 212 or ITPT setting in memory 232, may be utilize by processor 210 or processor 240 to place memory device 204 in the non-operational mode. In previous information handling systems, an amount of time associated with an ITPT setting may be a fixed amount of time. For example, in these information handling systems the memory device may switch from an active mode into a non-operational power mode if there is no host I/O commands during this fixed idle time.

In certain examples, the amount of power saving within an information handling system may vary based the ITPT setting. For example, the shorter the ITPT setting, the faster the memory device may enter into the non-operational mode and therefore save more power. However, there is performance impact with the response latency increase if a new I/O command is received immediately after the memory device transitions into the non-operational power mode. In an example, the performance impact may be based on an additional wake up time needed for the memory device to switch from the non-operational mode into the active mode. The interval between incoming I/O commands may depend on many factors, including, but not limited to, workload, system speed, application, and user behavior. If the ITPT timing setting is not optimized, an end user may either experience shorter battery time or response lag, and both may result a bad user experience.

In an example, information handling system 200 may be improved by processor 210 or processor 240 implementing an adaptive learning optimization operation to allow host controller 202 or memory controller 230 to adaptively adjust the ITPT setting based on an incoming data pattern to maximize the power savings and at the same time not increasing the responsive latency. In certain example, processor 210 of host controller 202 or processor 240 of memory controller 230 may perform the operations disclosure herein. Processor 210 may utilize the data in memory 212, such as ITPT setting 220, counter 222, and counter 224, to perform the operations disclosed herein. Similarly, processor 240 may utilize the data in memory 232, such as ITPT setting 250, counter 252, and counter 254, to perform the operations disclosed herein. In certain examples, the operations may be defined as a device self-initiated transition when processor 240 performs the operations and may be defined as host dedicated power transition when processor 210 performs the operations.

For clarity and brevity, the operations will be described with respect to processor 240 of memory controller 230, memory 232, ITPT setting 250, and counters 252 and 254. In certain examples, processor 240 of memory controller 230 may monitor and measure an impact on latency in memory device 204 due to a current ITPT setting and may adaptively tune the ITPT setting 250 to save more power while at the same time does not impact the memory device responsiveness. For example, processor 240 may adaptively vary ITPT setting 250 to tune the ITPT setting based on the incoming data pattern to achieve more power savings while at the same time not increasing the response latency. Vary ITPT setting 250 will be described with respect to FIGS. 2-5.

Figure 3:
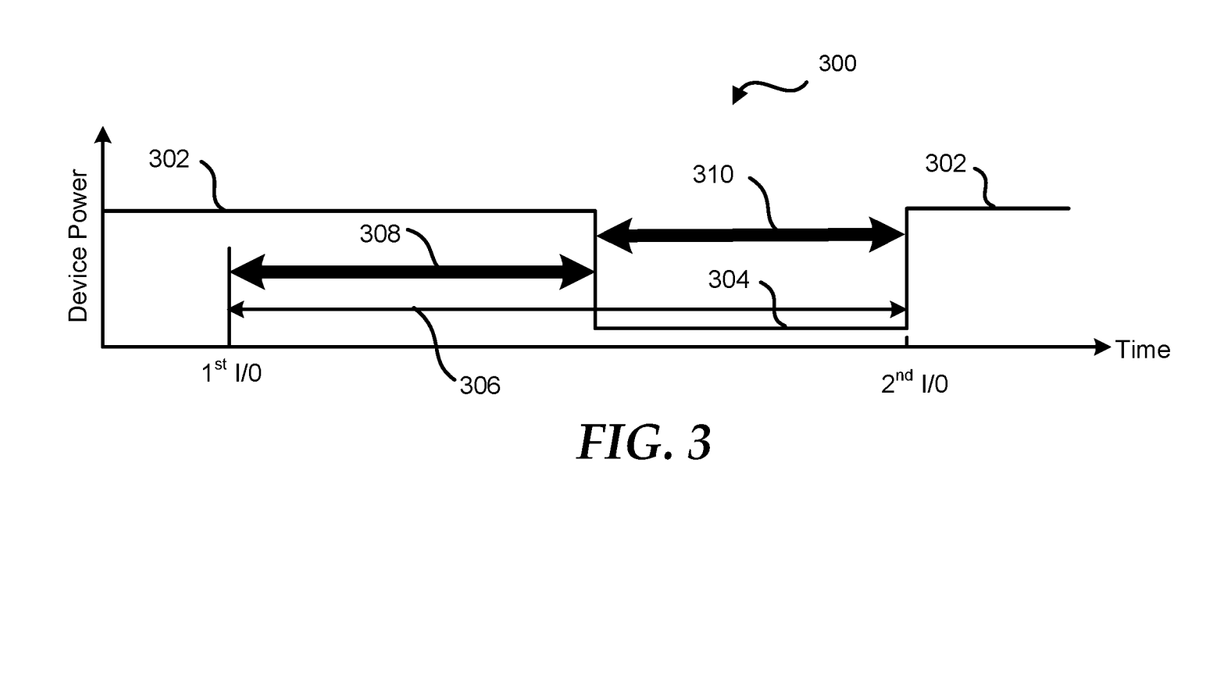
FIG. 3 illustrates a waveform of a power level for a memory device of the information handling system according to at least one embodiment of the present disclosure.

Referring to FIG. 3, a waveform 300 for the power states of memory device 204 in FIG. 2 is provided according to at least one embodiment of the present disclosure. Waveform 300 includes an active mode 302 and a non-operational mode 304. In an example, a larger ITPT setting 250 of FIG. 2 may provide a better response time but may worsen power savings within memory device 204 of FIG. 2. For example, if the timing between two consecutive I/O commands is 50 milliseconds and ITPT setting 250 of FIG. 2 is 60 milliseconds, memory device 204 of FIG. 2 may remain in active mode 302 when a second I/O command is received, such that memory controller 230 may be able to respond the I/O command immediately.

In an example, the smaller ITPT setting 250 of FIG. 2, the better the power saving but the worse the responsiveness latency. For example, if ITPT setting 250 of FIG. 2 is forty milliseconds, memory device 204 may transition into non-operational power mode 304 before the second I/O command is received. In this example, the response to second I/O command may be slow because memory device 204 of FIG. 2 wakes up from non-operational mode 304 and transitions to active mode 302 before responding to a host command. However, this smaller ITPT setting 250 of FIG. 2 provides more power savings as compared to the larger ITPT setting. In this example, the optimized ITPT setting 250 of FIG. 2 may be fifty milliseconds. This optimized ITPT setting 250 of FIG. 2 may be based on the power savings gained from the smaller ITPT setting is so small, due to memory device 204 of FIG. 2 immediately waking up from non-operational mode 304 that the power savings does not justify the response latency created by the short ITPT setting.

In certain examples, the workload of host controller 202 and memory device 204 of FIG. 2 may vary from time to time, and as a result a data pattern of consecutive I/O commands may also vary or change. In an example, a smaller ITPT setting 250 of FIG. 2 may not impact responsive latency if the time duration between two consecutive I/O commands is longer than the ITPT setting. For example, as illustrated in FIG. 3, a time period 306 between two consecutive I/O commands, such as a first I/O command and a second I/O command, may be substantially longer that an ITPT time 308. Time period 306 may be any suitable amount of time including, but not limited to, ninety milliseconds, one hundred milliseconds, and one hundred and ten milliseconds. In an example, ITPT time 308 may be determined based on ITPT setting 250 of FIG. 2 stored in memory 232 of FIG. 2. ITPT time 308 may be any suitable amount of time after the reception of the first I/O command, such as fifty-five milliseconds, sixty milliseconds, sixty-five milliseconds, or the like.

In response to the expiration of ITPT time 308, memory device 204 may transition from active mode 302 to non-operational mode 304. When memory device 204 is in non-operational mode 304, the power usage of the memory device may be substantially equal to zero, such that the memory device may have power savings during a non-operational period 310. In an example, non-operational period 310 may be any suitable amount of time from when memory device 204 transitions to non-operational mode 304 and when the second I/O command is received. As shown in FIG. 3, non-operational period 310 may end based on memory device 204 transitioning from non-operational mode 304 to active mode 302 when the second I/O command is received.

Figure 4:
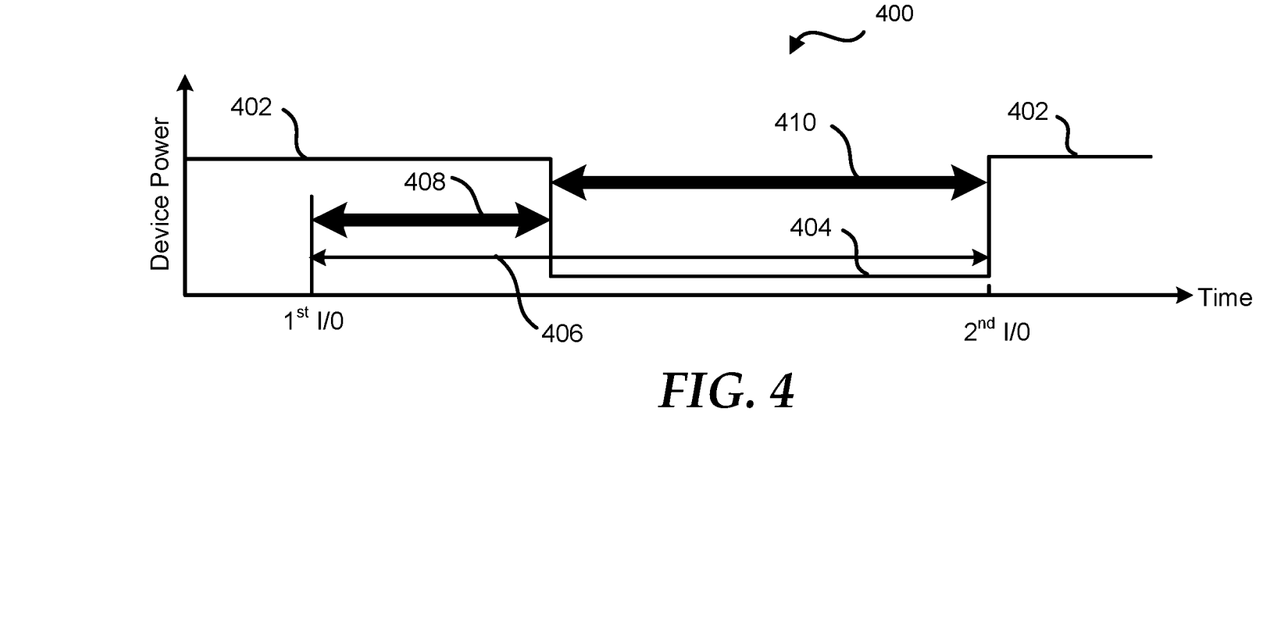
FIG. 4 is another waveform of a power level for a memory device of the information handling system according to at least one embodiment of the present disclosure.

FIG. 4 shows a waveform 400 for the power states of memory device 204 in FIG. 2 according to at least one embodiment of the present disclosure. Waveform 400 includes an active mode 402 and a non-operational mode 404. In an example, a time period 406 between two consecutive I/O commands, such as a first I/O command and a second I/O command, may be substantially longer that an ITPT time 408. Time period 406 may be any substantially equal to time period 306 in FIG. 3. In an example, ITPT time 408 may be determined based on ITPT setting 250 stored in memory 232 of FIG. 2. ITPT time 408 may be less than ITPT time 308 of FIG. 3 and may be any suitable amount of time after the reception of the first I/O command, such as thirty-five milliseconds, forty milliseconds, forty-five milliseconds, or the like.

In response to the expiration of ITPT time 408, memory device 204 of FIG. 2 may transition from active mode 402 to non-operational mode 404. When memory device 204 of FIG. 2 is in non-operational mode 304, the power usage of the memory device may be substantially equal to zero, such that the memory device may have power savings during a non-operational period 410. In an example, non-operational period 410 may be any suitable amount of time from when memory device 204 of FIG. 2 transitions to non-operational mode 404 and when the second I/O command is received. As shown in FIG. 4, non-operational period 410 may end based on memory device 204 of FIG. 2 transitioning from non-operational mode 404 to active mode 404 when the second I/O command is received.

In an example, when time period 406 is substantially longer than ITPT times 308 and 408, as shown in FIGS. 3 and 4, both of ITPT settings may have the same latency to response to the second I/O command. In this example, the smaller ITPT setting, such as ITPT time 408, is the preferred ITPT setting because this ITPT setting saves more power as compared to the larger ITPT setting, such as ITPT 308. The power savings associated with ITPT time 408 may be greater than the power savings associated with ITPT time 308 because memory device 204 of FIG. 2 will be in non-operational mode 404 for a greater amount of time with the ITPT time 408.

Referring to FIG. 2, processor 240 may perform one or more suitable operations to monitor the incoming data pattern of I/O commands and adaptively adjust ITPT setting 250 based on changes in the data pattern of the I/O commands. In an example, processor 240 may determine an impact of a different ITPT setting to the response latency to achieve more power savings without increasing the response latency. In certain examples, processor 240 may utilize different parameters while varying ITPT setting 250. The parameters include, but are not limited to, a maximum ITPT setting ($ITPT_{max}$), a minimum ITPT setting ($ITPT_{min}$), a current ITPT setting (ITPT), and an ITPT step size.

In an example, $ITPT_{max}$ may define a maximum allowed ITPT setting and $ITPT_{min}$ may define a minimum allowed ITPT setting. In certain examples, $ITPT_{min}$ may be no less than the power mode transition latency for memory device 204. The power mode transition latency may be any suitable length of time, such as ten milliseconds, fifteen milliseconds, twenty milliseconds, or the like. In an example, the step size may be a predetermined step size of the ITPT setting 250, such as five milliseconds, ten milliseconds, fifteen milliseconds, or the like. In certain examples, ITPTmax, ITPTmin, ITPT, and time step may all be stored within memory 232, such as within a memory region associated with ITPT setting 250 or any other suitable memory regions of the memory.

Figure 5:
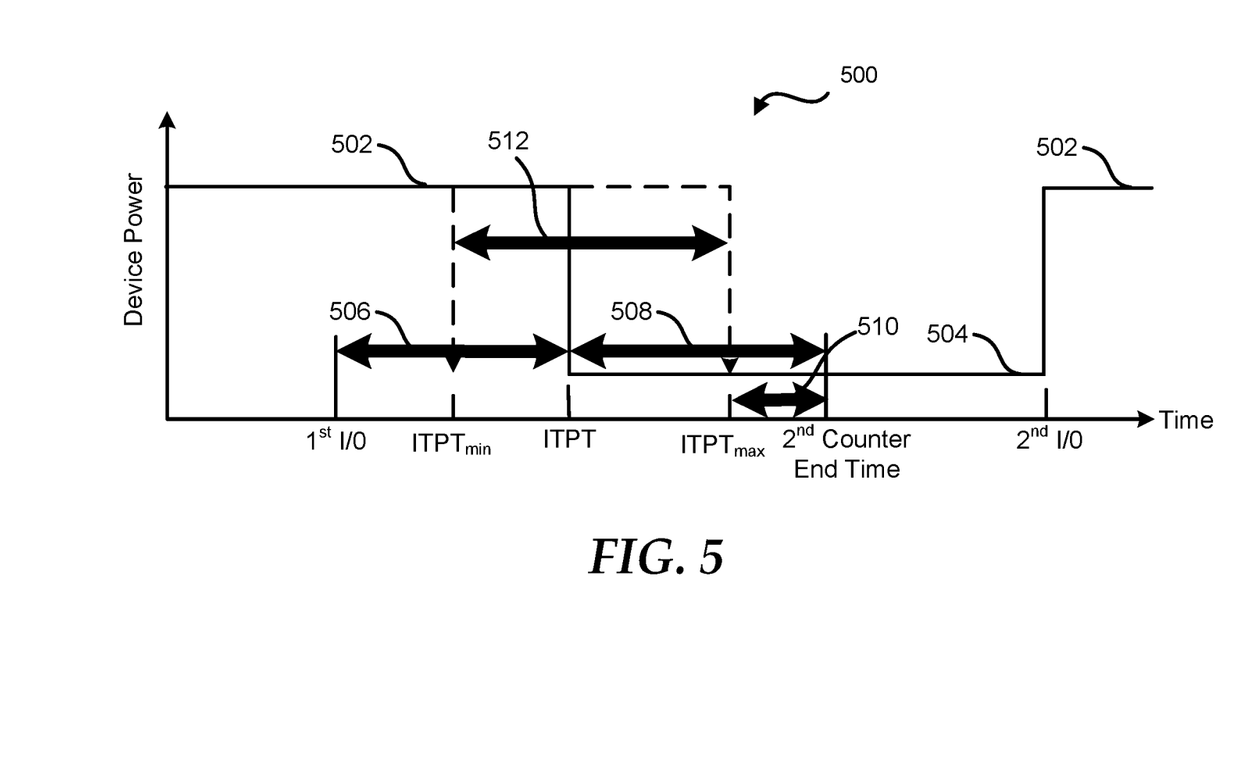
FIG. 5 illustrates another waveform of a power level for a memory device of the information handling system according to at least one embodiment of the present disclosure.

FIG. 5 illustrates a waveform 500 of a power level for a memory device of the information handling system according to at least one embodiment of the present disclosure. Waveform 500 includes an active mode 502 and a non-operational mode 504. In an example, a processor, such as processor 240 of FIG. 2, may perform one or more suitable operations to determine an ITPT setting for the information handling system. In certain examples, processor 240 may utilize a first counter time period 506 and a second counter time period 508 to determine an ITPT setting, such as ITPT setting 250 of FIG. 2. In an example, first counter time period 506 may be defined as the length of time from the reception of a first I/O command to a current ITPT 250. The second counter time period 508 may be defined as a length of time from the current ITPT to a particular amount of time 510 after the $ITPT_{max}$. The particular amount of time 510 may be any suitable length of time as defined by processor 240, a user of the information handling system, or the like.

In an example, if most second I/O commands are received an extended amount of time from $ITPT_{max}$, processor 240 may set ITPT setting 250 equal to $ITPT_{min}$, which may enable memory device 204 to save more power without an impact on latency. However, if most second I/O commands are received between $ITPT_{min}$ and $ITPT_{max}$, the configuration of ITPT setting 250 may be critical to the response latency in memory device 204. In this situation, processor 240 may set an ITPT setting that may prevent memory device 204 from transitioning into non-operational mode 504 before a response to the second I/O command is performed.

In certain example, $ITPT_{max}$ may be selected based on any suitable factor, such as a selecting an ITPTmax that may result in a particular amount of power savings in memory device 204. In an example, the particular amount of power savings may be a minimum amount of power savings desired for memory device 204.

In an example, processor 240 may utilize first counter 252 and second counter 254 to monitor the number of times memory device 204 transits into non-operational mode 504 and the number of times the memory device wakes up within a short duration after transitioning into the non-operational mode. First counter 252 may be utilized to track the number of times memory device 204 enters into non-operational mode 504 based on current ITPT setting 250. In an example, first counter 252 may be incremented based on any suitable event including, but not limited to, memory device 204 transitioning from active mode 502 to non-operational mode 504 during first counter time period 506.

Second counter 254 may be utilized to track the number of times memory device 204 wakes up within second counter time period 508 to respond to a second I/O command. In certain examples, second counter 254 may be incremented based on any suitable event including, but not limited to, memory device 204 transitioning from non-operational mode 504 to active mode 502 in response to a second I/O command being received during second counter time period 508. In an example, second counter time period 508 may be used to monitor how often memory device 204 wakes up within a short duration after the memory device has transited into non-operational mode 504 to respond I/O command under current ITPT setting 250. In certain examples, a starting point for second counter time period 508 may be the current ITPT, which is when the memory device 204 transits into non-operational mode 504. The end point for second counter time period 508 may be $ITPT_{max}$+ particular amount of time 510. Therefore, second counter time period 508 may be calculated by $(ITPT_{max}-ITPT)$+ particular amount of time 510 after memory device 204 has transited into non-operational mode 504. In an example, the particular amount of time may be any suitable amount of time that is the minimum duration memory device 250 may stay in non-operational mode 504 to have a minimum amount of power savings. In an example, shorter the ITPT chosen, the longer second counter time period 508 so that any increased wake up incidences based on the reduced the ITPT are captured.

In certain examples, processor 240 may calculate a current counter ratio of second counter 254 to first counter 252 and may utilize the current counter ratio to determine whether to vary ITPT setting 250. For example, the current counter ratio may be calculated based on second counter 254 divided by first counter 252. In certain examples, a higher value of second counter 254 for a current ITPT setting 250 may indicate more instances of the response latency of memory device 204 being impacted without a lot of improvement of power savings in the memory device.

Processor 240 may calculate a current counter ratio in response to any suitable trigger event, such as when first counter 252 equals a threshold value. In an example, the threshold value may be any suitable number of times that memory device 204 transitions from active mode 502 to non-operational mode 254 during first counter time period 506. For example, the threshold value of first counter 242 may be set to a high enough number to make sure processor 240 may have sufficient samples collected to make a statistically reliable current counter ratio. In an example, the smaller the threshold value, the more sensitive varying ITPT setting 250 is to the incoming data pattern, such that a too small of a threshold value may lead to unstable result. In certain examples, the threshold value to create a statistically reliable result may include, but is not limited to, one hundred, one hundred and ten, and one hundred and twenty. In an example, the higher the threshold value, the longer response time to change or vary ITPT setting 250. After the current counter ratio is calculated, each of first and second counters 252 and 254 may be reset to a predetermined value, such as zero.

In an example, the current counter ratio may represent a percentage of a number of times memory device 204 wakes up from non-operational mode 504 with an impact on the responsiveness to the second I/O command without much improvement of power savings under current ITPT setting 250. In response to processor 240 calculating the current counter ratio, the processor may perform one or more suitable operations to determine whether to change the current ITPT setting 250 based on the calculated counter ratio. For example, processor 240 may compare the current counter ratio to both a previous counter ratio and a threshold percentage. In an example, the predetermined percentage may be any suitable percentage including, but not limited to, four percent, five percent, and six percent. In certain examples, the predetermined percentage may vary based on a user setting, based on operations being before by a host processor of an information handling system, or the like.

In an example, if the current counter ratio is less than or equal to the previous counter ratio and is also less than a threshold percentage, processor 240 may determine that current ITPT setting 250 results in memory device 204 transitioning into and remaining in non-operational mode 504 long enough to have a power savings gain before the memory device wakes up for the second I/O command. In an example, the determination by processor 240 may be that the power savings gain is achieved a large amount of the time including, but not limited to, ninety percent of the time, ninety-two percent of the time, ninety-five percent of the time, and ninety-six percent of the time. This determination by processor 240 may indicate one of two possible situations for the first and second I/O commands. In an example, the first situation may be that in the majority of the time, the period of time between the consecutive first and second I/O commands is long enough that the second I/O command is received substantially after $ITPT_{max}$. The second situation may be that in the majority of the time, the period of time between the consecutive first and second I/O commands is short enough that the second I/O command is received before ITPT.

Processor 240 may perform any suitable number of additional operations to determine whether the second I/O command is received a long time after $ITPT_{max}$ or is received before ITPT. In response to the second I/O command being received a long time after $ITPT_{max}$, processor 240 may determine to further reduce ITPT setting 250 to save more power in memory device 204. In an example, processor 240 may reduce ITPT setting 250 by the step size and then monitor the next calculated counter ratio. If the next calculated counter ratio continues to be less than or equal to the previous counter ratio, processor 240 may determine that the second I/O command of most two consecutive I/O commands is a long time after $ITPT_{max}$. In this situation, processor 240 may repeat the operations above until $ITPT=ITPT_{min}$.

In an example, if processor 240 determines that the second I/O is received before ITPT, the processor may or may not reduce ITPT setting 250 because a reduction in the ITPT setting may increase the value of second counter 254. In this situation, processor 240 may continue to monitor additional I/O commands until a next counter ratio is calculated. In an example, after the next counter ratio is calculated, processor 240 may determine the new counter ratio is both larger than the previous counter ratio and less than the predetermined threshold percentage. Based on this determination for the new counter ratio, processor 240 may keep ITPT setting 250 the same and continue monitoring the next counter ratio. However, if the new counter ratio is bigger than or equal to the predetermined percentage, processor 240 may increase ITPT setting 250 by one step size until the ITPT is equal to $ITPT_{max}$. In certain examples, processor 240 may perform the above self-learning operations to determine an optimized ITPT setting 250 that is adaptive to incoming data patterns to save more power while not impacting latency responsiveness in memory device 204.

Figure 6:
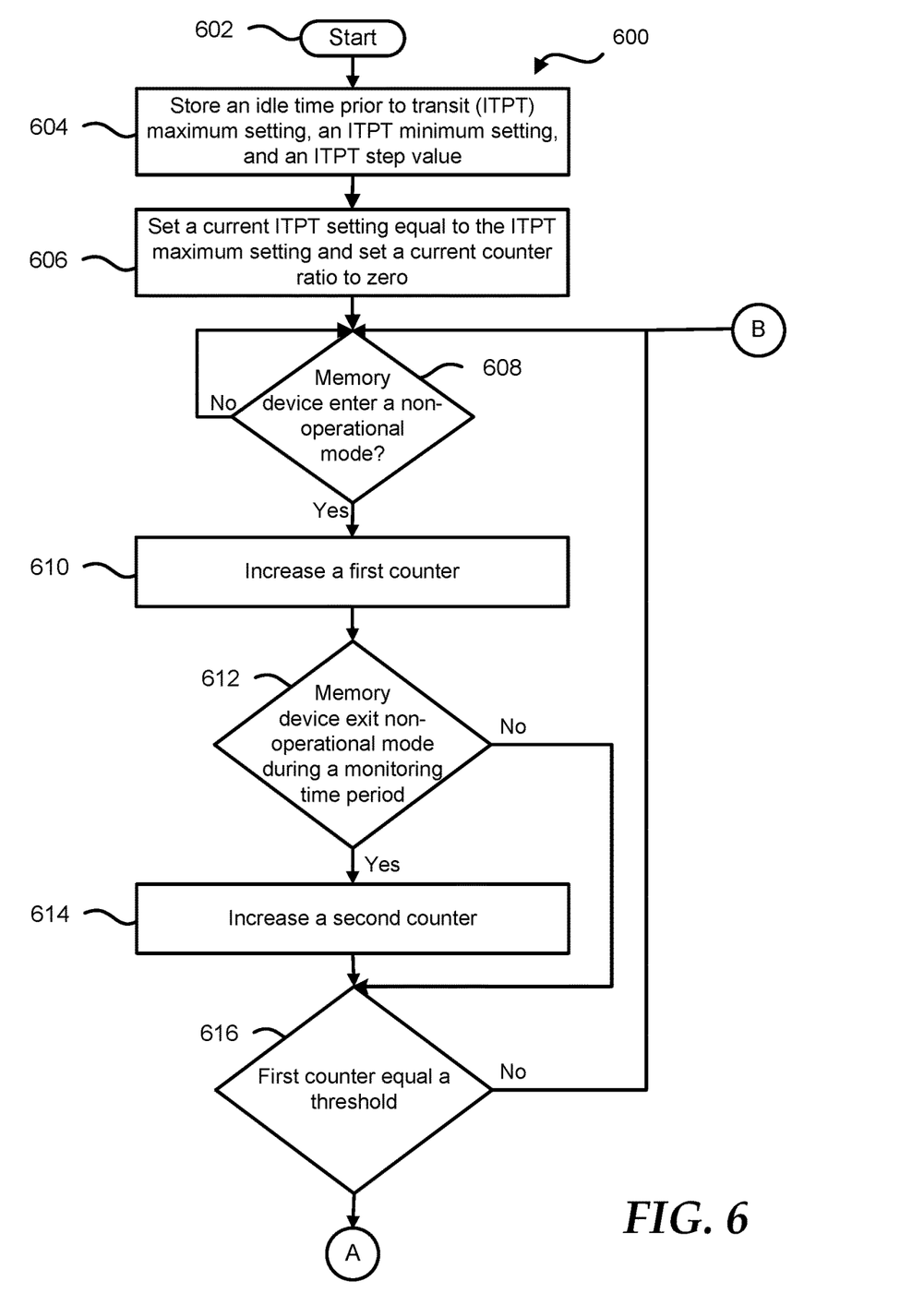
FIGS. 6 and 7 are a flow diagram of a method for dynamically setting an idle time prior to transition setting for a memory device of an information handling system according to at least one embodiment of the present disclosure.
Figure 7:
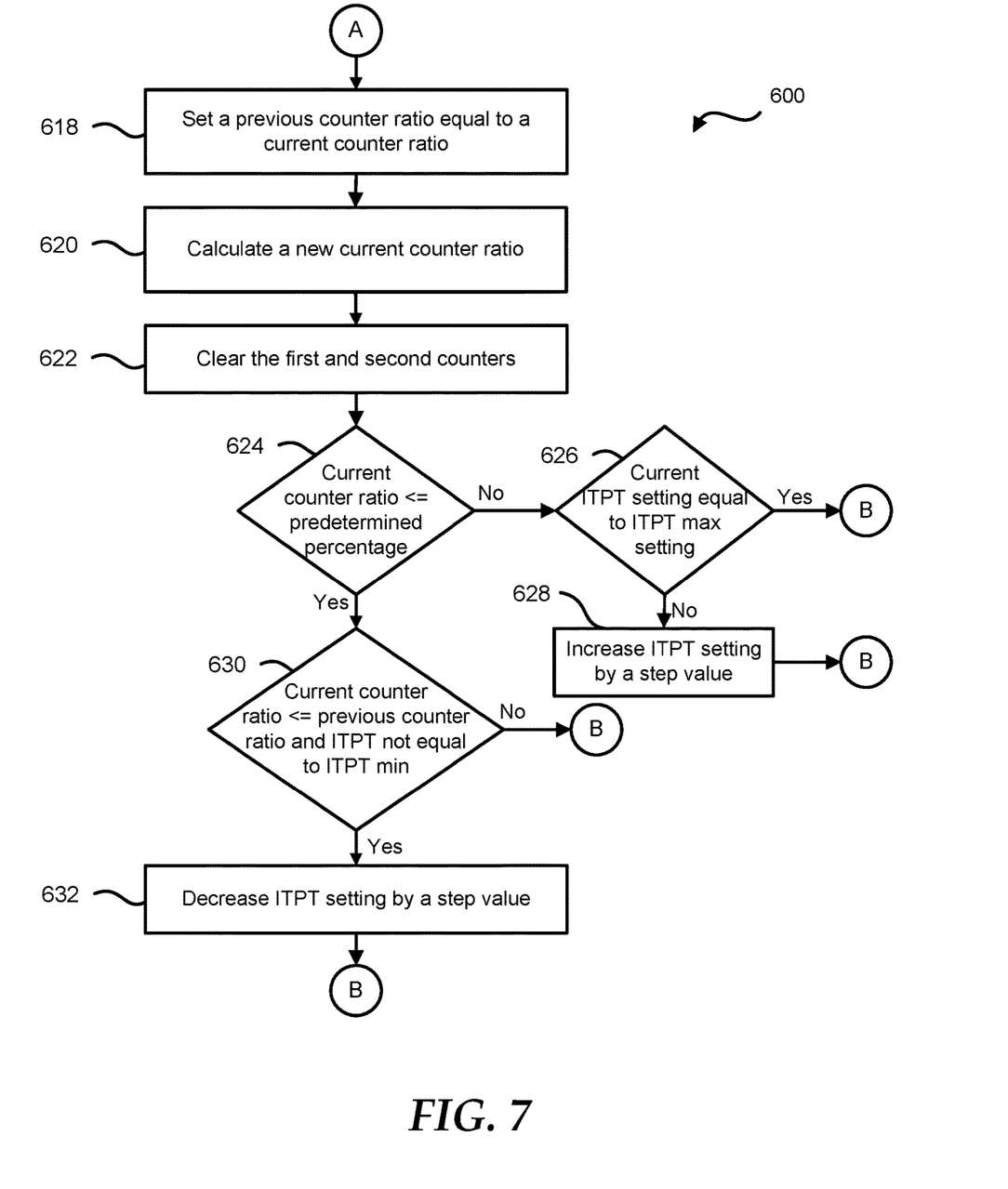

FIGS. 6 and 7 illustrate a flow diagram of a method 600 for dynamically setting an idle time prior to transition setting for a memory device of an information handling system according to at least one embodiment of the present disclosure, starting at block 602. It will be readily appreciated that not every method step set forth in this flow diagram is always necessary, and that certain steps of the methods may be combined, performed simultaneously, in a different order, or perhaps omitted, without varying from the scope of the disclosure. FIG. 6 may be employed in whole, or in part, processor 210 or processor 240 of FIG. 2, or any other type of controller, device, module, processor, or any combination thereof, operable to employ all, or portions of, the method of FIG. 6.

At block 604, an ITPT maximum setting, an ITPT minimum setting, and an ITPT step size are stored. In an example, the ITPT maximum setting may be any suitable maximum amount of time for a processor of a memory device to wait from a previous I/O command until the memory device transitions to a non-operational mode. The ITPT minimum setting may be any suitable minimum amount of time for a processor of a memory device to wait from a previous I/O command until the memory device transitions to a non-operational mode. In an example, the ITPT minimum setting may be any suitable amount of time, such as an amount of time greater than a memory device power mode transition latency. The memory device power mode transition latency may vary from memory device to memory device, such that the latency may include, but is not limited to, ten milliseconds, fifteen milliseconds, and twenty milliseconds. In certain examples, the ITPT step size may be any suitable amount of time that may be adding or subtracted from a current ITPT setting to create a new ITPT setting.

At block 606, a current ITPT setting is set equal to the ITPT maximum setting, and a current counter ratio is set to a predetermined value. In an example, the predetermined value may be any suitable ratio value including, but not limited to, zero and one. In certain examples, the counter ratio may be a ratio between a first counter value and a second counter value. In an example, the first counter value may indicate a number of times the memory device enters into the non-operational mode based on the current ITPT setting. The second counter value may indicate a number of times that the memory device wakes up from the non-operational mode during a monitoring time period. In an example, the monitoring time period for the second counter value may be a monitoring time period defined as the current ITPT setting subtracted from the ITPT maximum setting plus a fixed amount of time. In certain examples, the fixed amount of time may be any suitable amount of time including, but not limited to, fifteen millisecond, twenty milliseconds, and twenty-five milliseconds. In an example, the fixed amount of time may be set based on a minimum duration that the memory device should stay in the non-operational mode to have an increase in power savings that overcomes an increase in mode transition latency.

At block 608, a determination is made whether the memory device entered the non-operational mode. In response to the memory device being entered into the non-operational mode, the first counter is increased at block 610. At block 612, a determination is made whether the memory device has exited the non-operational mode during the monitoring time period. If the memory device has not exited the non-operational mode during the monitoring time period, the flow continues at block 616. In the memory device has exited the non-operational mode during the monitoring time period, the second counter is increased at block 614.

At block 616, a determination is made whether the first counter is equal to a threshold value. If the first counter is not equal to the threshold value, the flow continues as stated above at block 608. If the first counter is equal to the threshold value, a previous ratio is set to a current ratio at block 618. At block 620, a new current ratio is calculated. In an example, the new current ratio is calculated by the second counter being divided by the first counter value. At block 622, the first and second counters are cleared.

At block 624, a determination is made whether the current ratio is less than or equal to a predetermined percentage. In an example, the predetermined percentage may be any suitable percentage including, but not limited to, four percent, five percent, and six percent. In certain examples, the predetermined percentage may vary based on a user setting, based on operations being before by a host processor of an information handling system, or the like. If the current ratio is not less than or equal to the predetermined ratio, a determination is made whether the current ITPT setting is equal to the ITPT maximum setting at block 626. If the ITPT setting is equal to the ITPT maximum setting, the flow continues as stated above at block 608. If the ITPT setting is not equal to the ITPT maximum setting, the current ITPT setting is increased by the ITPT step value at block 628 and the flow continues as stated above at block 608.

If, at block 624, the current ratio is less than or equal to the predetermined ratio, a determination is made whether both the current ratio is less than or equal to a previous ratio and whether the current ITPT setting is not equal to the ITPT minimum setting at block 630. If either the current ratio is not less than or equal to a previous ratio or the current ITPT setting is equal to the ITPT minimum setting, the flow continues as stated above at block 608. If either the current ratio is not less than or equal to a previous ratio or the current ITPT setting is equal to the ITPT minimum setting, the current ITPT setting is decreased by the ITPT step value at block 632 and the flow continues as stated above at block 608.

Figure 8:
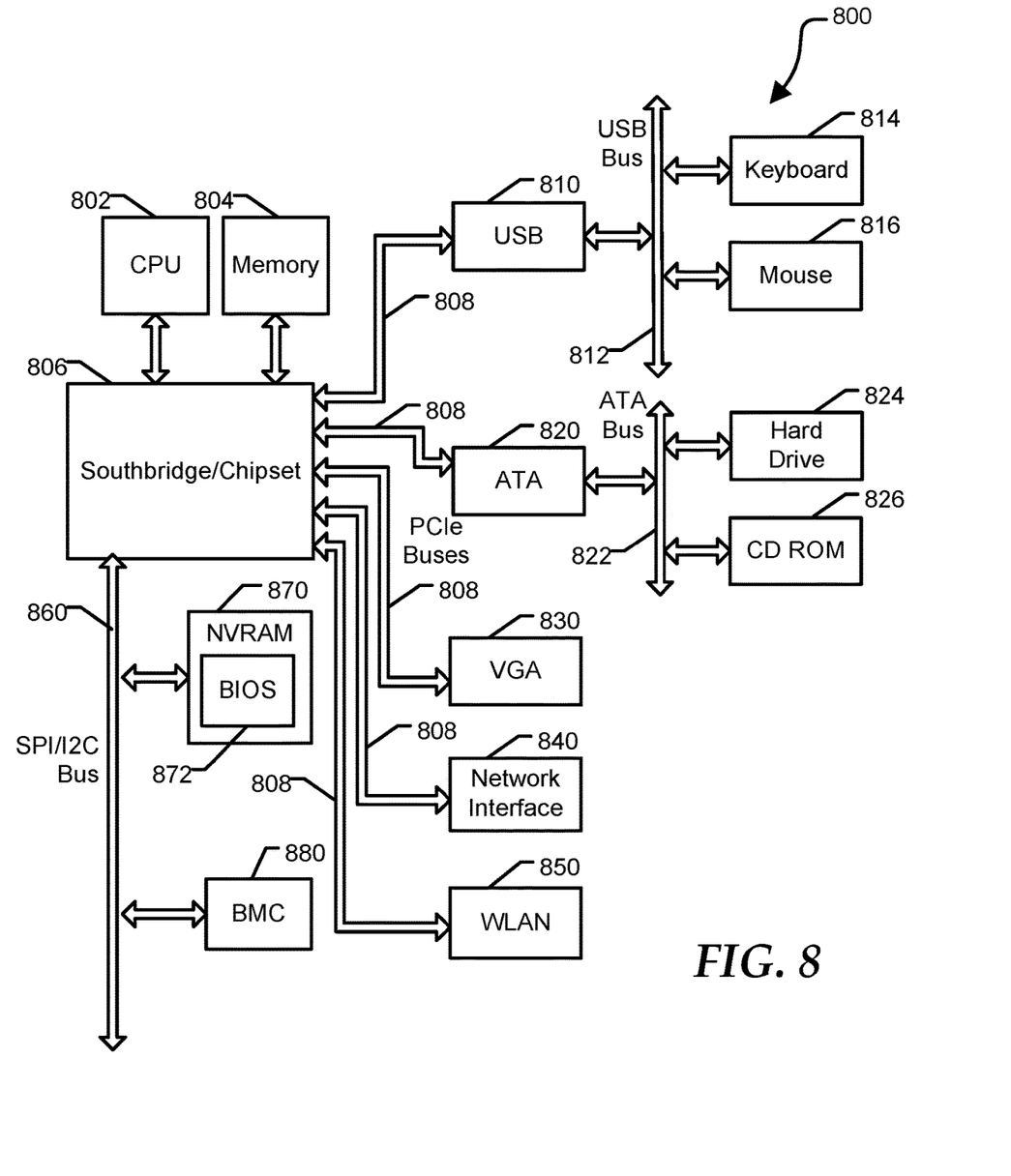
FIG. 8 is a block diagram of an information handling system according to an embodiment of the present disclosure.

FIG. 8 illustrates an information handling system 800 including a processor 802, a memory 804, a chipset 806, a PCI bus 808, a universal serial bus (USB) controller 810, a USB 812, a keyboard device controller 814, a mouse device controller 816, a configuration database 818, an ATA bus controller 820, an ATA bus 822, a hard drive device controller 824, a compact disk read only memory (CD ROM) device controller 826, a video graphics array (VGA) device controller 830, a network interface controller (NIC) 840, a wireless local area network (WLAN) controller 850, a serial peripheral interface (SPI) bus 860, a flash memory device 870 for storing BIOS code 872, a trusted platform module (TPM) 880, and a baseboard management controller (EC) 890. EC 890 can be referred to as a service processor, and embedded controller, and the like. Flash memory device 870 can be referred to as a SPI flash device, BIOS non-volatile random access memory (NVRAM), and the like. EC 890 is configured to provide out-of-band access to devices at information handling system 800. As used herein, out-of-band access herein refers to operations performed without support of CPU 802, such as prior to execution of BIOS code 872 by processor 802 to initialize operation of system 800. In an embodiment, system 800 can further include a platform security processor (PSP) 874 and/or a management engine (ME) 876. In particular, an x86 processor provided by AMD can include PSP 874, while ME 876 is typically associated with systems based on Intel x86 processors.

PSP 874 and ME 876 are processors that can operate independently of core processors at CPU 802, and that can execute firmware prior to the execution of the BIOS by a primary CPU core processor. PSP 874, included in recent AMD-based systems, is a microcontroller that includes dedicated read-only memory (ROM) and static random access memory (SRAM). PSP 874 is an isolated processor that runs independently from the main CPU processor cores. PSP 874 has access to firmware stored at flash memory device 870. During the earliest stages of initialization of system 800, PSP 874 is configured to authenticate the first block of BIOS code stored at flash memory device 870 before releasing the x86 processor from reset. Accordingly, PSP 874 provides a hardware root of trust for system 800. ME 876 provides similar functionality in Intel-based systems. In another embodiment, EC 890 can provide aspects of a hardware root of trust. The root of trust relates to software processes and/or hardware devices that ensure that firmware and other software necessary for operation of an information handling system is operating as expected.

Information handling system 800 can include additional components and additional busses, not shown for clarity. For example, system 800 can include multiple processor cores, audio devices, and the like. While a particular arrangement of bus technologies and interconnections is illustrated for the purpose of example, one of skill will appreciate that the techniques disclosed herein are applicable to other system architectures. System 800 can include multiple CPUs and redundant bus controllers. One ore more components can be integrated together. For example, portions of chipset 806 can be integrated within CPU 802. In an embodiment, chipset 806 can include a platform controller hub (PCH). System 800 can include additional buses and bus protocols, for example I2C and the like. Additional components of information handling system 800 can include one or more storage devices that can store machine-executable code, one or more communications ports for communicating with external devices, and various input and output (I/O) devices, such as a keyboard, a mouse, and a video display.

For purposes of this disclosure information handling system 800 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 800 can include processing resources for executing machine-executable code, such as CPU 802, a programmable logic array (PLA), an embedded device such as a System-on-a-Chip (SoC), or other control logic hardware. Information handling system 800 can also include one or more computer-readable medium for storing machine-executable code, such as software or data.

BIOS code 872 can be referred to as a firmware image, and the term BIOS is herein used interchangeably with the term firmware image, or simply firmware. In an embodiment, BIOS 872 can be substantially compliant with one or more revisions of the Unified Extensible Firmware Interface (UEFI) specification. As used herein, the term Extensible Firmware Interface (EFI) is used synonymously with the term UEFI. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 800. While the techniques disclosed herein are described in the context of a UEFI compliant system, one of skill will appreciate that aspects of the disclosed systems and methods can be implemented at substantially any information handling system having configurable firmware.

BIOS code 872 includes instructions executable by CPU 802 to initialize and test the hardware components of system 800, and to load a boot loader or an operating system (OS) from a mass storage device. BIOS code 872 additionally provides an abstraction layer for the hardware, i.e. a consistent way for application programs and operating systems to interact with the keyboard, display, and other input/output devices. When power is first applied to information handling system 800, the system begins a sequence of initialization procedures. During the initialization sequence, also referred to as a boot sequence, components of system 800 are configured and enabled for operation, and device drivers can be installed. Device drivers provide an interface through which other components of the system 800 can communicate with a corresponding device.

The storage capacity of SPI flash device 870 is typically limited to 32 MB or 64 MB of data. However, original equipment manufacturers (OEMs) of information handling systems may desire to provide advanced firmware capabilities, resulting in a BIOS image that is too large to fit in SPI flash device 870. Information handling system can include other non-volatile flash memory devices, in addition to SPI flash device 870. For example, memory 804 can include non-volatile memory devices in addition to dynamic random access memory devices. Such memory is referred to herein as non-volatile dual in-line memory module (NVDIMM) devices. In addition, hard drive 824 can include non-volatile storage elements, referred to as a solid state drive (SSD). For still another example, information handling system 800 can include one or more non-volatile memory express (NVMe) devices. Techniques disclosed herein provide for storing a portion of a BIOS image at one or more non-volatile memory devices in addition to SPI flash device 870.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a host controller; and
a memory device to receive I/O commands from the host controller, the memory device including:
a memory to store an initial idle time prior to transition (ITPT) setting
a processor configured to:
set the initial ITPT setting as a current ITPT setting for the memory device of the information handling system;
monitor input/output (I/O) commands from a host in the information handling system, wherein the monitoring of the I/O commands includes:
increase a first counter in response to the memory device entering a non-operational mode based on the current ITPT setting; and
increase a second counter in response to the memory device entering an operational mode within a particular amount of time from when the memory device entered the non-operational mode;
vary the current ITPT setting based on a current ratio of the second counter to the first counter;
compare the current ratio to a previous ratio;
in response to the current ratio being both greater than the previous ratio and greater than a particular ratio threshold, increase the current ITPT setting by a step size and repeat the monitoring of the I/O commands; and
in response to the current ratio being both less than or equal to the previous ratio and less than the particular ratio threshold, decrease the current ITPT setting by the step size and repeat the monitoring of the I/O commands.

2. The information handling system of claim 1, wherein the processor further to:
calculate the current ratio when the first counter is equal to a particular value; and
reset the first and second counters in response to the current ratio being calculated.

3. The information handling system of claim 1, wherein to perform the increasing of the current ITPT setting by the step size, the processor further to:
determine whether the current ITPT setting is equal to a maximum ITPT setting; and
in response to the current ITPT setting being less than the maximum ITPT setting, increase the current ITPT setting by the step size.

4. The information handling system of claim 1, wherein to perform the decreasing of the current ITPT setting by the step size, the processor further to:
determine whether the current ITPT setting is equal to a minimum ITPT setting; and
in response to the current ITPT setting being more than the minimum ITPT setting, decrease the current ITPT setting by the step size.

5. The information handling system of claim 1, wherein a non-zero value of the second counter indicates that the memory device is experiencing a number of I/O commands with an impacted latency without a gain in power savings, wherein the latency is based on the memory device transitioning from the non-operational mode to the operational mode after the I/O command is received at the memory device.

6. The information handling system of claim 1, wherein the particular amount of time is equal to a maximum ITPT setting plus another amount of time.

7. The information handling system of claim 1, wherein the ITPT setting is an amount of time between when an I/O command is received to when the memory device is placed in the non-operational mode.

8. A method comprising:
setting, in a memory of an information handling system, an initial idle time prior to transition (ITPT) setting as a current ITPT setting for a memory device of the information handling system;
monitoring input/output (I/O) commands from a host in the information handling system, including:
increasing a first counter in response to the memory device entering a non-operational mode based on the current ITPT setting; and
increasing a second counter in response to the memory device entering an operational mode within a particular amount of time from when the memory device entered the non-operational mode;
varying the current ITPT setting based on a current ratio of the second counter to the first counter;
comparing the current ratio to a previous ratio;
in response to the current ratio being both greater than the previous ratio and greater than a particular ratio threshold, increasing the current ITPT setting by a step size and repeating the monitoring of the I/O commands; and in response to the current ratio being both less than or equal to the previous ratio and less than the particular ratio threshold, decreasing the current ITPT setting by the step size and repeating the monitoring of the I/O commands.

9. The method of claim 8, further comprising:
calculating the current ratio when the first counter is equal to a particular value; and
resetting the first and second counters in response to the current ratio being calculated.

10. The method of claim 8, wherein to perform the increasing of the current ITPT setting by the step size, the method further comprising:
determining whether the current ITPT setting is equal to a maximum ITPT setting; and
in response to the current ITPT setting being less than the maximum ITPT setting, increasing the current ITPT setting by the step size.

11. The method of claim 8, wherein to perform the decreasing of the current ITPT setting by the step size, the method further comprising:
determining whether the current ITPT setting is equal to a minimum ITPT setting; and
in response to the current ITPT setting being more than the minimum ITPT setting, decreasing the current ITPT setting by the step size.

12. The method of claim 8, wherein a non-zero value of the second counter indicates that the memory device is experiencing a number of I/O commands with an impacted latency without a gain in power savings, wherein the latency is based on the memory device transitioning from the non-operational mode to the operational mode after the I/O command is received at the memory device.

13. The method of claim 8, wherein the particular amount of time is equal to a maximum ITPT setting plus another amount of time.

14. The method of claim 8, wherein the ITPT setting is an amount of time between when an I/O command is received to when the memory device is placed in the non-operational mode.

15. A non-transitory computer-readable medium including code that when executed performs a method, the method comprising:
setting an initial idle time prior to transition (ITPT) setting as a current ITPT setting for a memory device of an information handling system;
monitoring input/output (I/O) commands from a host in the information handling system, including:
increasing a first counter in response to the memory device entering a non-operational mode based on the current ITPT setting; and
increasing a second counter in response to the memory device entering an operational mode within a particular amount of time from when the memory device entered the non-operational mode;
varying the current ITPT setting based on a current ratio of the second counter to the first counter;
comparing the current ratio to a previous ratio;
in response to the current ratio being both greater than the previous ratio and greater than a particular ratio threshold, increasing the current ITPT setting by a step size and repeating the monitoring of the I/O commands; and
in response to the current ratio being both less than or equal to the previous ratio and less than the particular ratio threshold, decreasing the current ITPT setting by the step size and repeating the monitoring of the I/O commands.

16. The non-transitory computer-readable medium of claim 15, wherein to perform the increasing of the current ITPT setting by the step size, the method further comprising:
determining whether the current ITPT setting is equal to a maximum ITPT setting; and
in response to the current ITPT setting being less than the maximum ITPT setting, increasing the current ITPT setting by the step size.

17. The non-transitory computer-readable medium of claim 15, wherein to perform the decreasing of the current ITPT setting by the step size, the method further comprising:
determining whether the current ITPT setting is equal to a minimum ITPT setting; and
in response to the current ITPT setting being more than the minimum ITPT setting, decreasing the current ITPT setting by the step size.

\* \* \* \* \*